(12) United States Patent
Kiefer et al.

(10) Patent No.: US 11,783,121 B2
(45) Date of Patent: Oct. 10, 2023

(54) WHITELISTING REDACTION SYSTEMS AND METHODS

(71) Applicant: OPEN TEXT HOLDINGS, INC., San Mateo, CA (US)

(72) Inventors: Bruce Edward Kiefer, Denver, CO (US); Rakesh Babulal Bhatt, Castle Pines, CO (US); Jose Ramon Cornado Garcia, Lakewood, CO (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 182 days.

(21) Appl. No.: 17/365,947

(22) Filed: Jul. 1, 2021

(65) Prior Publication Data
US 2023/0004710 A1     Jan. 5, 2023

(51) Int. Cl.
| | |
|---|---|
| G06F 40/18 | (2020.01) |
| G06F 40/103 | (2020.01) |
| G06F 9/54 | (2006.01) |
| G06F 16/93 | (2019.01) |
| G06F 40/216 | (2020.01) |

(52) U.S. Cl.
CPC .............. *G06F 40/18* (2020.01); *G06F 9/547* (2013.01); *G06F 16/93* (2019.01); *G06F 40/103* (2020.01); *G06F 40/216* (2020.01)

(58) Field of Classification Search
CPC ........ G06F 16/93; G06F 40/103; G06F 40/18; G06F 40/216; G06F 9/547
See application file for complete search history.

(56) References Cited

U.S. PATENT DOCUMENTS

| | | | |
|---|---|---|---|
| 8,645,391 B1 | 2/2014 | Wong et al. | |
| 11,531,846 B1* | 12/2022 | Bodapati | G06F 9/541 |
| 2008/0046757 A1 | 2/2008 | Staddon et al. | |
| 2015/0089357 A1* | 3/2015 | Vandervort | G06F 40/166 |
| | | | 715/256 |
| 2017/0126741 A1 | 5/2017 | Lang et al. | |

(Continued)

OTHER PUBLICATIONS

Anith Mathai, "Getting redactions right in eDiscovery", published on May 20, 2021, pp. 8 (Year: 2021).*

(Continued)

*Primary Examiner* — Chau T Nguyen
(74) *Attorney, Agent, or Firm* — SPRINKLE IP LAW GROUP

(57) ABSTRACT

A whitelisting approach to redaction may include receiving a normalization request containing a binary file with complex structured data, such as a workbook or spreadsheet file, from an application on a user device through a redaction service provided by an e-discovery platform. In response to the normalization request, a normalization process starts and runs asynchronously to apply a whitelist to the binary file. The whitelist is configurable and specifies features (e.g., data types, workbook object types, etc.) of the binary file that are considered safe by a party to a lawsuit or investigation. The normalization process includes a pre-processing stage, a transferring stage, and a post-processing stage to push all the data to a visible level and produce a normalized document with the whitelisted features. An artifact containing the normalized document can then be generated and used to render a normalized representation for interactive redaction.

18 Claims, 10 Drawing Sheets

(56) References Cited

U.S. PATENT DOCUMENTS

| | | |
|---|---|---|
| 2019/0222560 A1 | 7/2019 | Ford et al. |
| 2020/0110902 A1 | 4/2020 | Zakour |
| 2021/0120126 A1 | 4/2021 | Dwyer et al. |
| 2021/0227271 A1* | 7/2021 | Cox ............... H04N 21/234318 |
| 2022/0043935 A1* | 2/2022 | Brannon ................. G06F 16/35 |

OTHER PUBLICATIONS

"How PDF Redaction Tools Can Secure Documents", published on Mar. 22, 2021, from https://www.accusoft.com, pp. 4 (Year : 2021).*

Kam Woods, "Redacting Private and Sensitive Information in Born—Digital Collections", May 2015, Article in Archiving Conference, DOI: 10.2352/issn.2168-3204.2015.12.1.art0002, pp. 7 (Year: 2015).*

International Search Report and Written Opinion issued for International PCT Application No. PCT/US2022/035980, dated Nov. 3, 2022, 11 pages.

Lisa L. Fowler, "Analysis and Experiences with Information Flow Tracking as a Practical Menas to Prevent Data Leakage," Electical Engineering and Computer Sciences, Dec. 9, 2011, 26 pages.

Lee et al., "Automated Redaction of Private and Personal Data in Collections, Proceedings of the Memory of the World in the Digital Age: Digitalization and Preservation," An International Conference on permanent access to digital documentary heritage presented by The University of British Columbia, Canada, Sep. 26-28, 2012, 17 pages.

* cited by examiner

| | A | B | C | D | E |
|---|---|---|---|---|---|
| 1 | Segment | Country | Product | Discount Band | Units Sold |
| 2 | Government | Canada | Carretera | None | 1618.5 |
| 3 | Government | Germany | Carretera | None | 1321 |
| 4 | Midmarket | France | Carretera | None | 2178 |
| 5 | Midmarket | Germany | Carretera | None | 888 |
| 6 | Channel Partners | Mexico | Carretera | None | 2470 |
| 7 | Government | Germany | Carretera | None | 1513 |
| 8 | Midmarket | Germany | Montana | None | 921 |
| 9 | Channel Partners | Canada | Montana | None | 2518 |
| 10 | Government | France | Montana | None | 1899 |

FIG. 11

WHITELISTING REDACTION SYSTEMS AND METHODS

FIELD OF THE INVENTION

This invention relates generally to redaction technology. More particularly, this invention relates to redaction systems, methods, and computer program products having a whitelisting mechanism, useful for production of data in electronic discovery.

SUMMARY OF THE DISCLOSURE

For years, practitioners in the legal field have struggled with the challenges of electronic discovery. Today, companies generate millions of electronic documents, emails, messages, files, etc. on a daily basis. The sheer volume of data that could be involved in an electronic discovery process continues to be a technical challenge that needs to be addressed. Adding to this challenge is the fact that electronic documents, emails, messages, files, etc. often have disparate file formats. While disparate file formats are a problem of its own, exacerbating the problem is that even some commonly used file formats can be difficult to apply redaction technology.

For example, spreadsheet programs are commonly used by companies for data visualization and analysis. Spreadsheet files created using these spreadsheet programs can have a common file format (e.g., a binary file format optimized for fast loading and saving) that is recognizable by an operating system on which a spreadsheet program is run. A spreadsheet file in this common file format can contain multiple types of information, including text, microformats, macros, formulas, images, tables, and so on. The disparate nature of these data types makes it difficult to apply redaction technology efficiently, accurately, and effectively to a spreadsheet file. Yet, redaction is a necessary part of electronic discovery. Accordingly, there is a need for a new approach to redaction, particularly for redacting files that contain multiple types of information, such that information contained therein can be discovered in an electronic discovery process without leaking any protected information. The invention disclosed herein can address this need and more by taking a whitelisting approach to redaction.

In some embodiments, a whitelisting approach to redaction may include receiving a normalization request containing a binary file with complex structured data, such as a workbook or spreadsheet file, from an application on a user device through a redaction service provided by an e-discovery platform. In response to the normalization request, a normalization process starts and runs asynchronously to apply a whitelist to the binary file. The whitelist is configurable and specifies features (e.g., data types, workbook object types, etc.) of the binary file that are considered safe by a party to a lawsuit or investigation. The normalization process includes a pre-processing stage, a transferring stage, and a post-processing stage to push all the data to a visible level and produce a normalized document with the whitelisted features. An artifact containing the normalized document can then be generated and used to render a normalized representation for interactive redaction.

More specifically, in some embodiments, a whitelisting redaction method may comprise receiving, from an application on a user device through a redaction service provided by an e-discovery platform, a normalization request containing a binary file. A normalization processor executing on the e-discovery platform may start a normalization process which runs asynchronously. The normalization process may include applying a whitelist to the binary file in a whitelisting process which produces a normalized document with whitelisted features, performing an artifact generation process to generate an artifact containing the normalized document, and storing the artifact in a data store on the e-discovery platform. Through the redaction service, the artifact containing the normalized document can be communicated to the user device. The artifact can then be used by a browser program on the user device to render a normalized representation of the normalized document for interactive redaction.

In some embodiments, the binary file may comprise a source workbook. Accordingly, the whitelisting process may comprise creating a target workbook which is initially empty and iteratively processing each source worksheet in the source workbook to transfer the whitelisted features to the target workbook using the whitelist. In this way, the target workbook is transformed into a normalized workbook.

In some embodiments, source worksheets in the source workbook are processed through an iterative process that includes pre-processing a source worksheet of the source workbook, the pre-processing including unhiding the source worksheet, unhiding a row of the source worksheet, or unhiding a column of the source worksheet to thereby produce a pre-processed worksheet; transferring content of the source worksheet to the pre-processed worksheet to thereby produce a target worksheet; and post-processing the target worksheet, the post-processing including removing empty rows and columns from the target worksheet and matching cell heights and widths to those of the source worksheet.

In some embodiments, the whitelist specifies whitelisted workbook object types. Accordingly, transferring content of a source worksheet to a pre-processed worksheet can include removing a set of workbook objects of the whitelisted workbook object types from the source worksheet and transferring cell values of the set of workbook objects to the target worksheet. In post-processing, the target worksheets are cleaned up and formatted to transform into a normalized workbook.

In some embodiments, the artifact is generated using the normalized document (e.g., a normalized workbook). Further, for each worksheet of the normalized document, any charts, pictures, comments, and/or worksheet content are added to a zip file. Document metadata (e.g., workbook metadata) can also be added to the zip file. The artifact encompasses the zip file and can be stored with other artifacts on the e-discovery platform. At this point, the artifact is ready for use in interactive redaction (e.g., through a normalized representation which is rendered using the artifact).

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIG. 11 shows a portion of a screenshot that illustrates an example of a normalized representation displayed through a redaction viewer according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
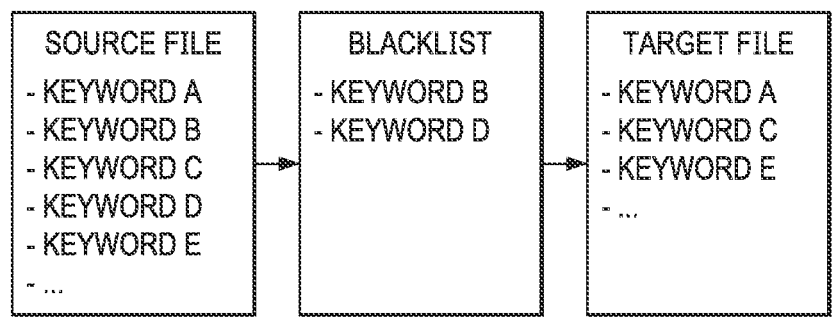
FIG. 1 depicts a diagrammatic representation of a blacklisting approach to redaction.

FIG. 1 depicts a diagrammatic representation of a blacklisting approach to redaction which attempts to remove everything that could be risky (e.g., information that might reveal a trade secret, data that is subject to data protection laws and regulations such as personal identifiable information, medical history, user credentials, etc., language that is considered inappropriate, threats that may raise security concerns, etc.) from a source file. However, with the blacklisting approach, it is hard to remove all that is risky because data could be hidden in the source file. For example, as alluded to above, some the formats may contain sub-data types that may embed a large of amount of invisible data in the a source file.

Further, the blacklisting approach relies on a blacklist to identify what information in a source file needs to be removed for legal purposes. If something is not blacklisted, it is not removed. In electronic discovery (which is also known as e-discovery, ediscovery, eDiscovery, or e-Discovery, and which is collectively referred to herein as e-discovery), it can be important to correctly identify, collect, and produce electronically stored information in response to a request for production in a law suit or investigation. However, items of information that should be blacklisted may constantly be evolving during an e-discovery process. If the blacklist is not current, accurate, or complete, information that should be removed may undesirably be leaked. This problem is exacerbated when a file format is updated with unexpected feature(s). When that happens, efforts to block or remove potentially dangerous content from a source file having a new feature(s) would fail because the existing blacklist does not include the new feature(s).

Usually, in data production, original documents are provided by one party to another. When exchanging electronically, the content of an original file is often turned into images of pages in the Tag Image File Format (TIFF). A recipient of the TIFF files then scans the TIFF files and runs an OCR to attempt to recreate the content of the original file from the images. This is not an efficient process and can be quite excruciatingly time-consuming and tedious. Further, for some file formats, it is not possible to accurately and/or completely recreate the content of the original files. Thus, in some data production cases, a party may desire to exchange the original files instead of the converted (e.g., page images) of the original files. However, in reality, this desire is often met with a technical challenge because existing redaction technology is inadequate when applied to certain file formats, such as spreadsheet files that contain multiple types of information.

A spreadsheet file is an example of a workbook, both of which are binary files having a binary file format. In computing, the term "binary file" is used to describe a non-text file, although parts of a binary file can be interpreted as text. A binary file consists of complex structured data that must be interpreted by a computer program or hardware processor that understands the corresponding binary format in advance. Formatting information, for example, is contained in binary form in a binary file and is used to interpret how to present the content of the binary file.

The invention disclosed herein can be particularly useful for preparing binary files for redaction. In the following description, a workbook is used as a non-limiting example of a binary file. Skilled artisans appreciate that the invention disclosed herein can be adapted for preparing other types of binary files for redaction.

A single workbook can contain several different types of related information as separate worksheets. All of these different types of related information can potentially contain data. Today, it is practically impossible to accurately and completely convert a workbook into an intermediary file or files in a format that is commonly acceptable for e-discovery purposes and then recreate the content of the workbook from the intermediary file or files.

A goal of the invention is to prepare and produce, given an original file (i.e., a source file in a binary format such as a workbook), a version of the original file that is considered safe (i.e., producing the least amount of risk for legal purposes) for data production in an e-discovery process. In this disclosure, this goal is realized by taking a whitelisting approach to process an original file and produce a version of the original the with the least amount of risk.

As discussed above, some data in a source file may be considered risky for e-discovery purposes and, therefore, should be redacted or otherwise removed from the source file. However, due to the complex data structure of a binary file, a piece of data could be found in different layers in a workbook, for instance, in a table, a cell, and a graph, some of which can be invisible to an end user. Ideally, such a piece of data should be removed from these places altogether. However, a human may not remember to redact or remove a particular piece of data from all these places.

Further, a human may not be able to redact or remove a particular piece of data from all these places. This is because, as discussed above, a human may not know where a piece of data could be hidden in all the places in a workbook. For example, an end user of a spreadsheet program may learn how to draw a pie graph, add data to the pie graph, and delete data from the pie graph. However, the end user may not know or even be aware that a piece of data used in the pie graph could also be hidden in a footnote, a comment, etc. of the workbook.

Even if the end user understands that a piece of data could be hidden in various types of workbook objects, it is extremely difficult for the end user to keep track of every piece of data in all the hidden places in the workbook when redacting the workbook manually. This is particularly the case for product management workbooks which can be quite complex and which tend to have a plurality of documents (e.g., worksheets) in each workbook.

Figure 2:
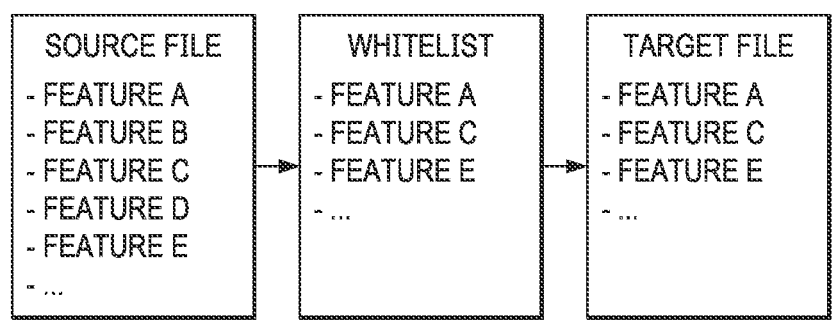
FIG. 2 depicts a diagrammatic representation of a whitelisting approach to redaction according to some embodiments disclosed herein.

To this end, FIG. 2 depicts a diagrammatic representation of a whitelisting approach to redaction that can alleviate the difficulty of preparing binary files for redaction and that can shield users from the complexity of redacting workbooks for e-discovery data production.

Unlike the blacklisting approach to redaction discussed above, whitelist operations allow "safe" data in an original file to be exported to a target file. For e-discovery, "safe" data refers to data that is considered by a party to be safe for inclusion in a collection of electronically stored information identified as necessary and appropriate for responding to a request for production in a lawsuit or investigation.

As illustrated in FIG. 2, the whitelisting approach utilizes a whitelist(s) to promote particular features (e.g., workbook objects of "safe" workbook object types) in a source file (e.g., a workbook such as a spreadsheet file or any binary file containing different data types, sometimes referred to as subtypes or sub-datatypes, of related information as separate worksheets). These whitelisted features are considered as safe for export by a party involved in a lawsuit or investigation. A target file, which is a version of the source file, is created with the avowed features or objects.

The whitelist can be revised overtime, particularly when a computer program or hardware processor is updated with a new way to process a workbook. For instance, suppose a spreadsheet program is updated with a new feature that allows certain background images to be redacted. A whitelist can be revised to include this new feature. The target file can be iterated through the revised whitelist and the resulting target file would include the redactable background images as they are now considered to be safe for production.

At the frontend, an end user such as a redaction reviewer is provided with a user interface (e.g., a redaction viewer) so that the redaction reviewer can configure the whitelist, as well as performing e-discovery tasks such as identifying a collection of original source files for production, reviewing the original source files, and applying redactions to the content of the original source files where necessary and appropriate. An example of this operation is illustrated in FIG. 3.

Figure 3:
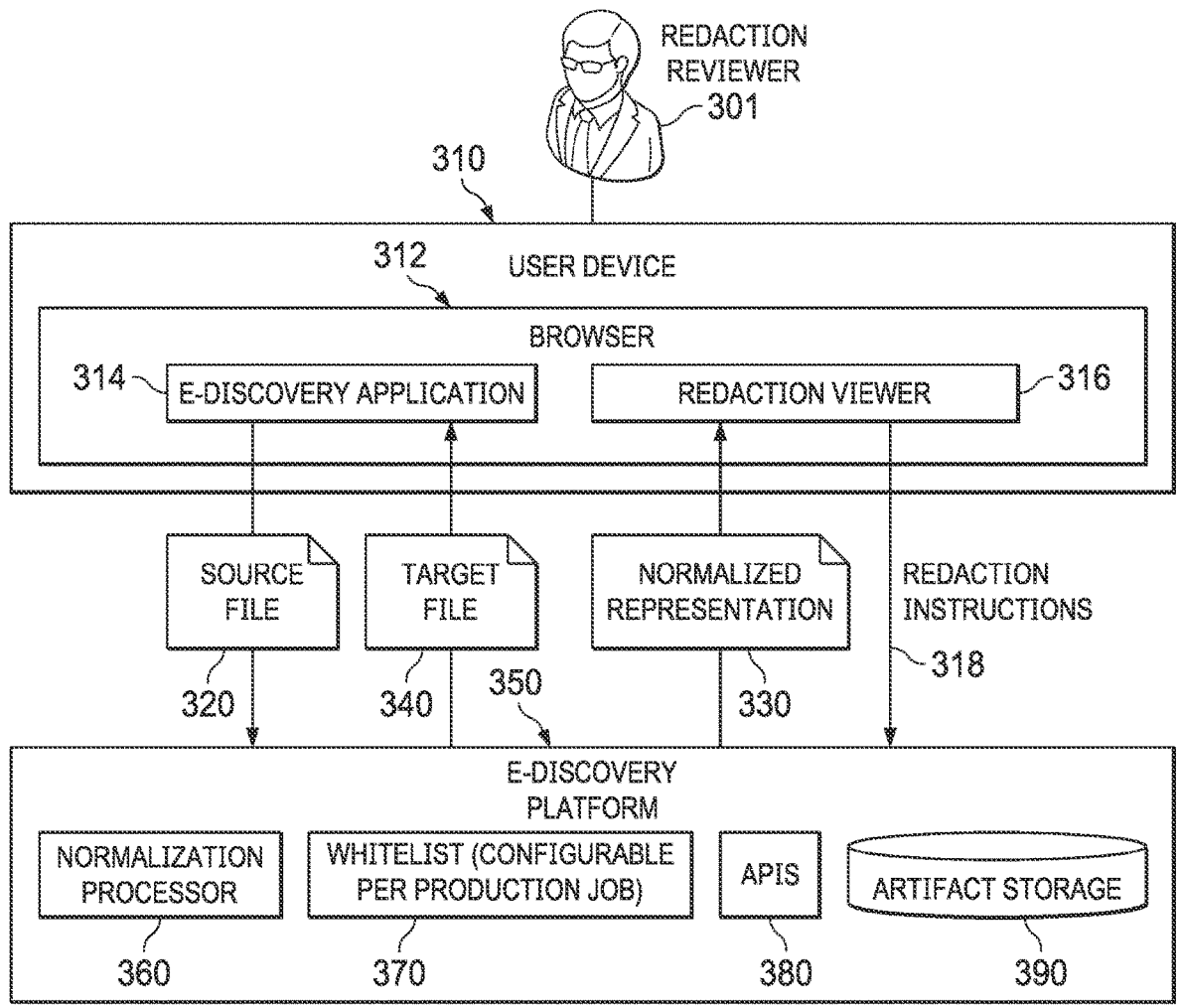
FIG. 3 depicts a diagrammatic representation of an example of an electronic discovery platform operating in a network computing environment according to some embodiments disclosed herein.

FIG. 3 depicts a diagrammatic representation of an example of an e-discovery platform 350 that is accessible by a redaction reviewer 301 of a user device 310 over a network and that operates in a network computing environment. In some embodiments, redaction reviewer 301 may direct a browser 312 on user device 310 to a cloud-based e-discovery application 314 for identifying a collection of original files in response to a request for production. The original files may reside on user device 310 and/or a network data storage (not shown). The network data storage can be a repository residing on the premises of an enterprise that employs redaction reviewer 301, a cloud-based data storage containing digital assets of the enterprise, etc. The cloud-based e-discovery application 314 may send the collection of original files thus identified to e-discovery platform 350 for further processing. Alternatively, in some embodiments, cloud-based e-discovery application 314 may examine the original files in the collection, determine which binary files would require whitelist operations, and provide those binary files as input source files to e-discovery platform 350.

As a non-limiting example, cloud-based e-discovery application 314 may communicate a source file 320 to e-discovery platform 350 through a redaction service provided by e-discovery platform 350. The redaction service may call an application programming interface (API) (e.g., API 380) of e-discovery platform 350 to start a normalization process to prepare source file 320 for interactive redaction.

A normalization processor 360 processes source file 320 utilizing a whitelist 370. Whitelist 370 is configurable per a production job or request. Normalization processor 360 iterates worksheets contained in source file 320 one by one through whitelist 370 and produces an artifact that can be used for rendering a normalized representation 330 for display on user device 310 through a redaction viewer 316. The artifact is a clean version of source file 320 and, initially, has features of source file 320 that are allowed per whitelist 370, with no redactions applied. Artifacts thus produced can be stored in a data storage 390 on e-discovery platform 350.

Redaction viewer 316 runs in a window of browser 312. Redaction reviewer 301 can mark up, or otherwise indicate, what features shown on normalized representation 330 should be redacted. Redaction viewer 316 communicates user indications (e.g., redaction markups) to e-discovery platform 350 as redaction instructions 318. A target file without the redacted features can then be generated following redaction instructions 318. Details and examples of normalization, whitelisting, and artifact generation processes will now be described with reference to FIGS. 4-6.

Figure 4:
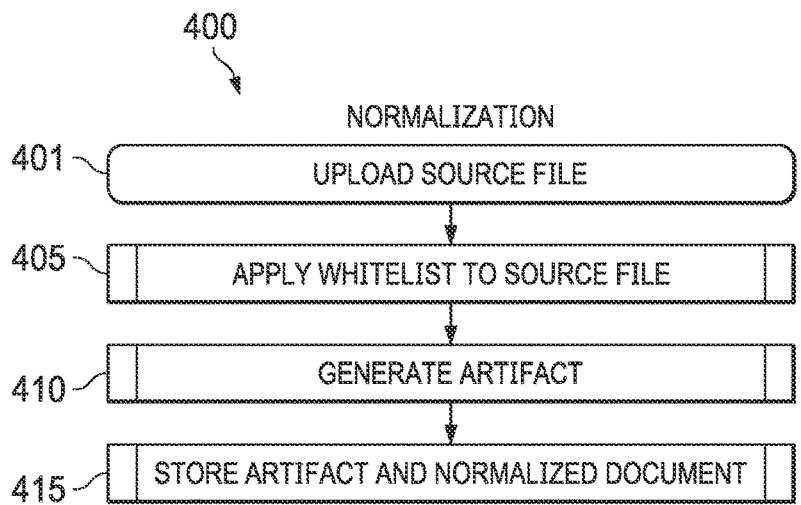
FIG. 4 is a flow chart illustrating an example of an overall normalization process according to some embodiments disclosed herein.

FIG. 4 is a flow chart illustrating an example of an overall normalization process according to some embodiments disclosed herein. In this invention, the term "normalization" refers to a process that is applied to documents in order to prepare them for redactions. This normalization process requires maintaining the accuracy of the data while reducing the risk of making privileged information that is not part of the redaction process available to third parties. With the whitelisting approach disclosed herein, normalization works on ensuring that only visible content is transferred from an original file to a target file. This allows for irrelevant or privileged objects to not be included in the target file, which is also referred to as a "normalized document."

Generally, a native normalization process involves applying various settings to a source file (e.g., a workbook) with multiple data types across worksheets contained in the workbook. Example settings can include unhiding rows/columns, unhiding worksheets, showing comments, deleting blank rows, removing protections, converting formulas into values, and so on. The native normalization process outputs a target file and an artifact, if requested. As illustrated in FIG. 4, an enhanced normalization process 400 according to embodiments can include uploading a source file (401), applying a whitelist to the source file (405), generating an artifact (410), and storing the artifact and a normalized document (415). Details of an example of a whitelisting process (405) are described below with reference to FIG. 5. Details of an example of an artifact generation process (410) are described below with reference to FIG. 6.

As alluded to above, the whitelist can include a configurable list of features (e.g., "safe" sub-datatypes, workbook object types, etc.) that can be included in a normalized representation of the source file. Depending on the application or application type used in generating the source file, the features may have different labels. Table 1 below provides a non-limiting example of a feature list of workbook object types that are native to a workbook application and a non-limiting example of a feature list of whitelisted object types.

TABLE 1

| Workbook Object Types | Whitelisted Object Types |
| --- | --- |
| Macros | Rows with Content Unhidden |
| External Links | Columns with Content Unhidden |
| Hyperlinks | Formatting |
| Shapes | Comments |
| Formulas | Charts |
| Blank Rows | Images |
| Blank Columns | |
| Query Tables | |
| Protection | |
| Background Images | |
| OLE Objects | |
| Scenarios | |
| Sparklines | |
| Hidden Sheets | |
| Revisions | |
| Merged cells | |
| Metadata | |
| Any New Features | |

Notice that, in this case, the feature list of whitelisted object types includes features such as "Rows with Content Unhidden," "Columns with Content Unhidden," etc. that are not part of the feature list of workbook object types. With these features, an end user (e.g., a redaction reviewer) can review and redact previously hidden data where necessary.

With a conventional redaction tool, an end user may only see an image of a single sheet in a spreadsheet file. However, for that single sheet, there can be multiple hidden sheets of data in the spreadsheet the that are not visible to the end user. Such hidden sheets can dramatically increase the amount of invisible data that could be in a source file in a production environment. The blacklist approach attempts to remove everything that could be risky from a production source file. However, it is extremely difficult to remove everything that could be risky from a source file because the source file may have many data types that may embed a large amount of invisible data. It is also impossible to anticipate future updates to a program and, therefore, impossible to include everything that could be risky in a blacklist.

The whitelisting approach discussed above can produce a normalized representation of a source file, particularly of a complex type such as a workbook having multiple data types. Through the normalization process discussed above, all the whitelisted data contained in the source file, whether visible or invisible, is pushed up to the same level. This normalization ensures that an end user (e.g., a redaction reviewer) can review all the whitelisted data in the source file and be able to identify and remove risky data cleanly in a production environment without possibly missing certain pieces of data that might be hidden somewhere in the source file.

Referring to FIG. 3, normalized representation 330 thus produced by normalization process 400 is accessible by redaction reviewer 301 through a browser-based application (e.g., redaction viewer 316) running on user device 310. In this case, normalized representation 330 shows whitelisted features of source file 320. Since whitelist 370 is configurable per production job, the whitelisted features of source file 320 may vary over time and/or per job.

Figure 5:
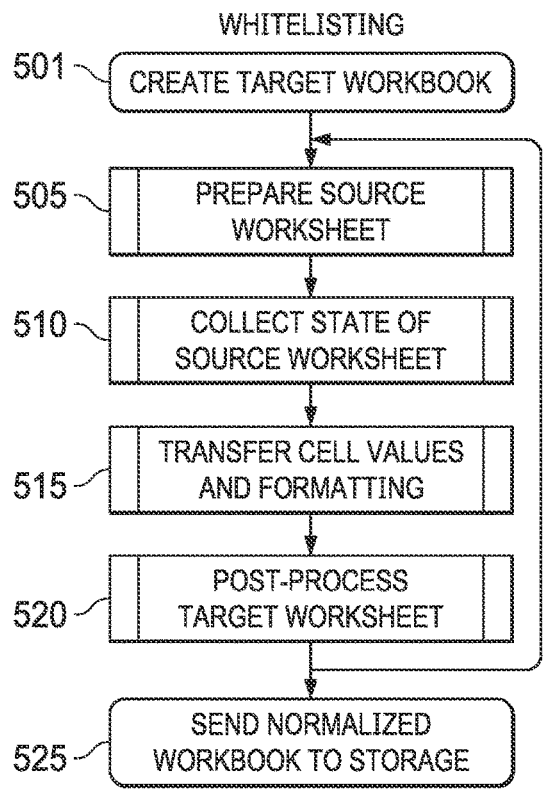
FIG. 5 is a flow chart illustrating an example of an overall whitelisting process according to some embodiments disclosed herein.

FIG. 5 is a flow chart illustrating an example of an overall whitelisting process 500 according to some embodiments disclosed herein. In processing and preparing a workbook (e.g., source file 320) for application of a whitelist, whitelisting process 500 begins with creating a target workbook that is initially empty (501). Whitelisting process 500 then iterates, one by one, worksheets contained in the workbook. Each iteration can include preparing (pre-processing) a source worksheet (505), collecting state information of the source worksheet (510), transferring cell values and format information from the source worksheet to a target worksheet of the target workbook using a whitelist (515), and post-processing the target worksheet (520). Details of a pre-processing process (505) are described below with reference to FIG. 7. Details of a transferring process (510) are described below with reference to FIG. 8. Details of a post-processing process (515) are described below with reference to FIG. 9. Through processing all the source worksheets in which each source worksheet is iterated through a pre-processing process, a transferring process, and a post-processing process, the target workbook is transformed into a normalized workbook with whitelisted features. Whitelisting process 500 then sends the normalized workbook to storage (e.g., artifact storage 390).

Figure 7:
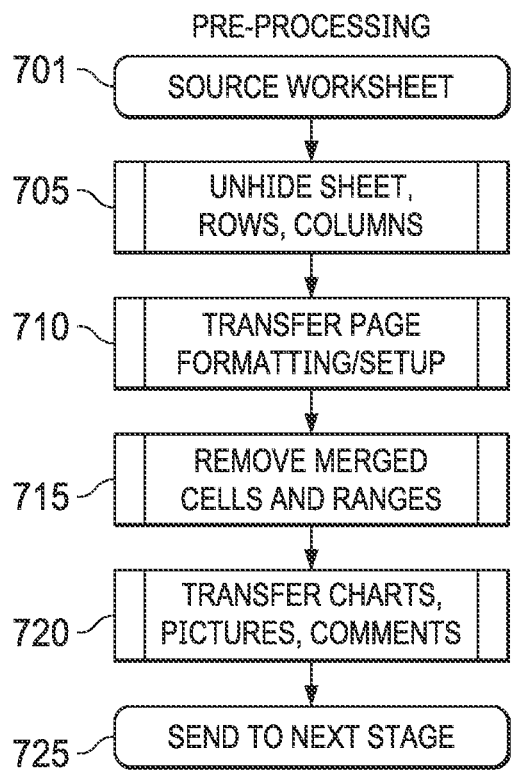
FIGS. 7-9 are flow charts illustrating a pre-processing stage, a transferring stage, and a post-processing stage of a whitelisting process according to some embodiments disclosed herein.

FIG. 7 is a flow chart that illustrates an example of processing performed at a pre-processing stage of whitelisting process 500 according to some embodiments disclosed herein. At this stage, pre-processing process 700 is operable to take a source worksheet 701 and performs a series of whitelisting operations, including unhiding the source worksheet, rows, and columns (705), transferring page formatting information and set up information (710), removing merged cells and ranges (715), and transferring any charts, pictures, comments, and so on to a target worksheet. A goal of this pre-processing is to identify what features (e.g., workbook objects of "safe" workbook object types) the source worksheet has which have been whitelisted, which have been removed from the source worksheet, and which can be presented to a user. Pre-processing process 700 can make a note of these features and keep the note as metadata for a target workbook. Pre-processing process 700 can then send the pre-processed target worksheet to the next stage (725).

Pre-processing process 700 can be useful when a computer program or hardware processor has been updated with a new feature(s). For example, a new version of a spreadsheet program may support a new feature or data type that is unknown to e-discovery platform 350. Pre-processing process 700 can identify and note this new feature. This allows a reviewer a chance to review the new feature, even if e-discovery platform 350 had never encountered the new feature before, allowing the whitelisting process disclosed herein to be "future-proof".

Figure 8:
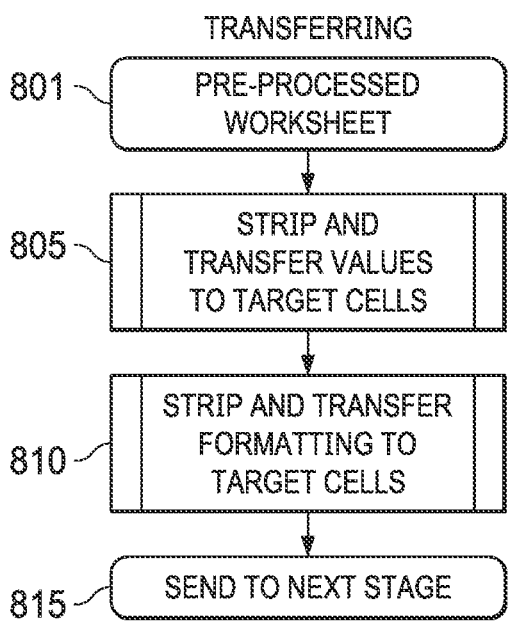

FIG. 8 is a flow chart that illustrates an example of processing performed at a transferring stage of whitelisting process 500 according to some embodiments disclosed herein. At this stage, transferring process 800 takes the pre-processed target worksheet (801) and performs cell-level transferring operations that remove/strip whitelisted features from the source worksheet and transfer their cell values (805) and formatting (810) to the target worksheet. As exemplified in Table 1 above, the whitelisted features can include unhidden contents of rows and columns, page formatting, comments, charts, images, etc. These whitelisted features are transferred or otherwise carried over to the new file (i.e., the target workbook). Transferring process 800 can then send the target worksheet to the next stage (815).

Figure 9:
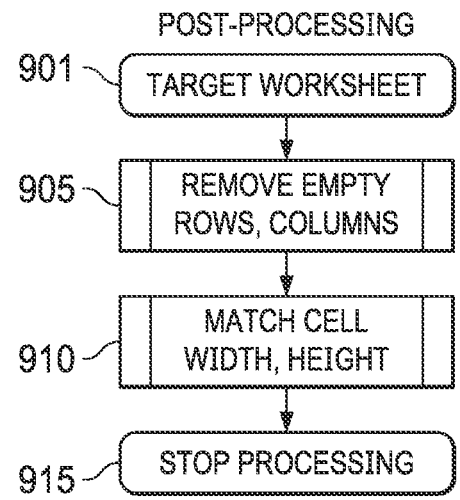

FIG. 9 is a flow chart that illustrates an example of processing performed at a post-processing stage of whitelisting process 500 according to some embodiments disclosed herein. At this stage, post-processing process 900 takes the target worksheet (901) and performs cleanup operations so that the target worksheet is suitable for use in artifact generation as a normalized worksheet (see FIG. 6). Examples of cleanup operations can include removing empty or blank rows and columns so they are not transferred to the new file (905) and matching cell widths and heights to those of the source worksheet (e.g., matching the width and height of a cell in the target worksheet to a corresponding cell in the source worksheet) (910). This produces clean content (e.g., a normalized workbook) for review and redaction. At this time, no redactions have been made and a final production file has not been generated.

Returning to FIG. 5, the normalized workbook produced by whitelisting process 500 is stored and used in generating an artifact which, in turn, can then be used to render or otherwise prepare a normalized representation of the source file for presentation through an e-discovery tool, such as e-discovery application 314 or redaction viewer 316 shown in FIG. 3. Although shown separately in FIG. 3, e-discovery application 314 and redaction viewer 316 can be part of a larger program. Alternatively, redaction viewer 316 can be a function of e-discovery application 314. Other implementations are also possible. Thus, FIG. 3 is meant to be illustrative, rather than limiting.

Figure 6:
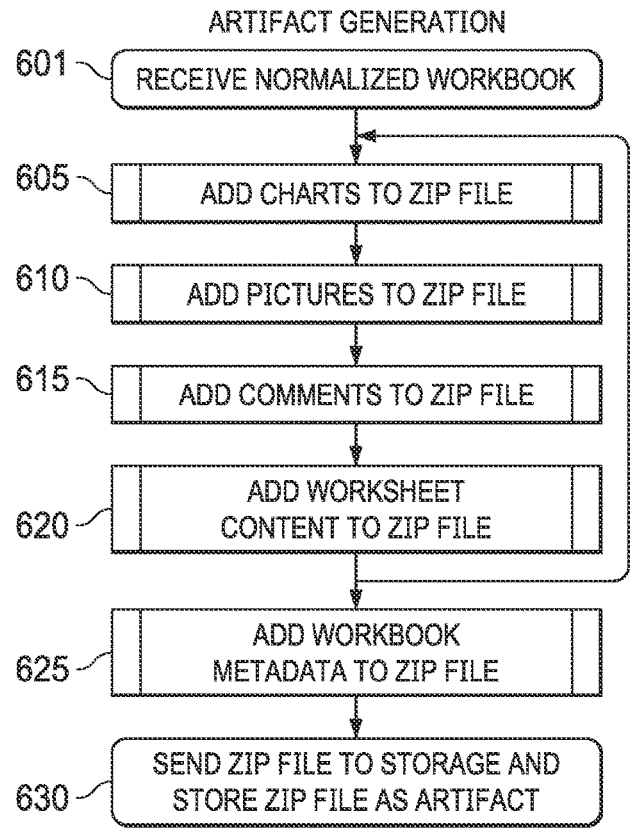
FIG. 6 is a flow chart illustrating an example of an overall artifact generation process according to some embodiments disclosed herein.

FIG. 6 is a flow chart that illustrates an example of an overall artifact generation process according to some embodiments disclosed herein. In this example, artifact generation process 600 begins with receiving a normalized workbook (601). Each worksheet of the normalized workbook is then processed for generation of an artifact (e.g., a zip file). More specifically, artifact generation process 600 iterates through each worksheet of the normalized workbook to add, to the zip file, the actual files of any charts (605), pictures (610), comments (615), and worksheet content (620), etc. referenced therein. Artifact generation process 600 then adds metadata associated with the normalized workbook to the zip file (625) and sends the artifact to storage (630).

Figure 10:
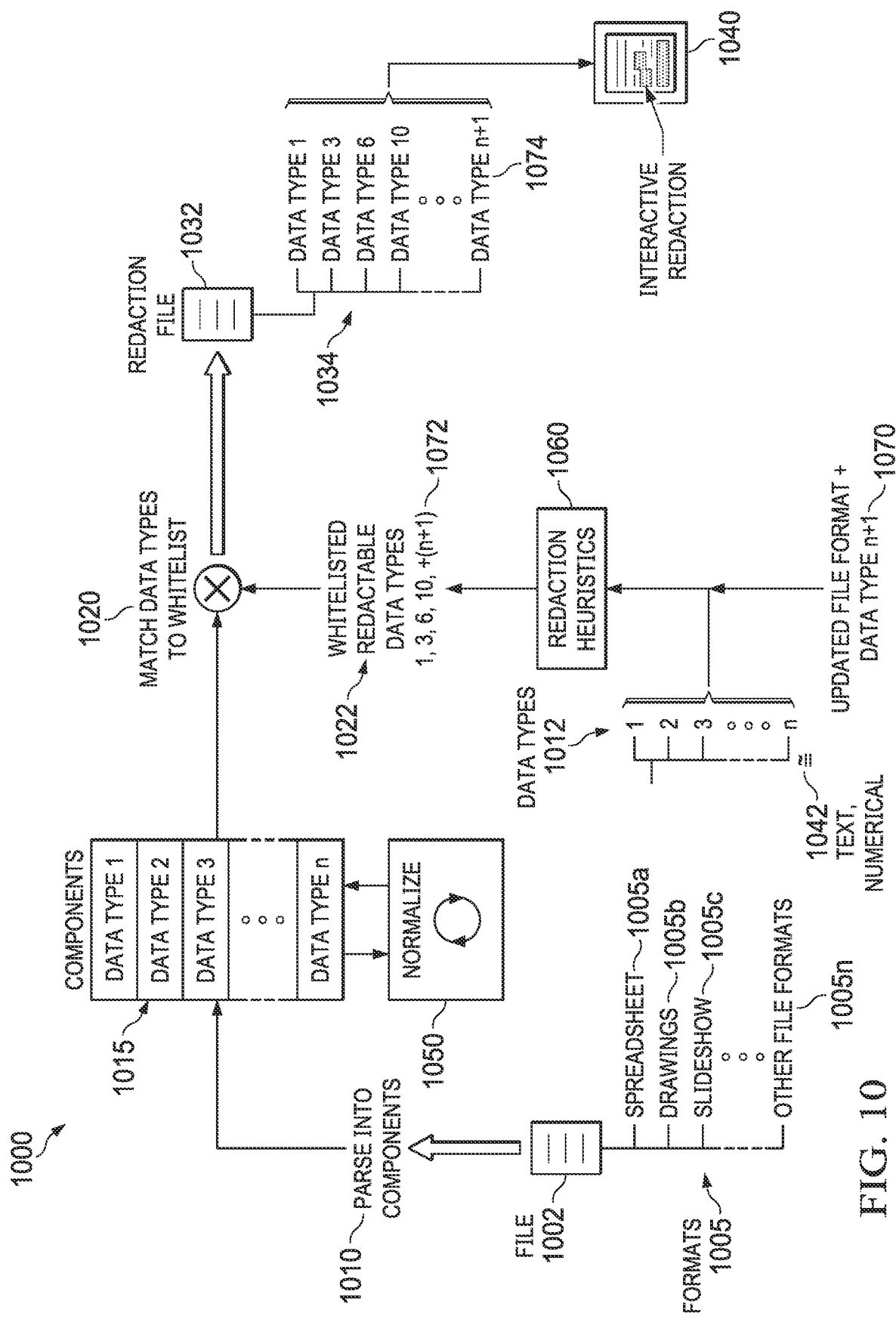
FIG. 10 depicts a flow diagram showing an example of whitelisting redactable data types of a file format according to some embodiments disclosed herein.

Referring now to FIG. 10, the inventive subject matter in one embodiment is directed to a new, novel, useful, and non-obvious method 1000 for whitelisting redactable data types for a binary file format so that such data types may be interactively redacted and produced, such as in an electronic discovery computing environment.

In the embodiment of FIG. 10, a file 1002 of a particular format 1005 is identified as a candidate for redaction. As a non-limiting example, file format 1005 can include a spreadsheet file format 1005a, a drawing file format 1005b, a slideshow file format 1005c, and/or any other file format 1005n desired for redaction.

In this embodiment, a system implementing method 1000 receives file 1002 and determines file format 1005. In the non-limiting example of FIG. 10, file 1002 is of spreadsheet file format 1005a which comprises data types 1, 2, 3 through n (generally represented by reference numeral 1012).

Next, the system parses (1010) file 1002 into components 1015. Here, each component 1015 comprises data for one of data types 1012 of spreadsheet file format 1005a. The system selects a sub-portion of components 1015 based on matching (1020) data types 1012 of a component 1015 to one of whitelisted, redactable data types 1022. In the example of FIG. 10, whitelisted data types 1022 include data type 1, data type 3, data type 6, and data type 10. The system generates redaction file 1032 and populates it with data having data types 1034 from file 1002 that matched whitelisted data types 1022.

Redaction file 1032 generated by the system may be of the same file format as original file 1002 or it may be a different file type that is more amenable for redaction. In some embodiments, an end user does not interact with redaction file 1031. Rather, redaction file 1032 is used to render a normalized representation in Hypertext Markup Language (HTML) that is more amenable for interactive redaction. The normalized representation may then be presented as a browser page for interactive redaction (1040).

FIG. 11 shows a portion of a screenshot showing an example of a redaction viewer 1100 through which a normalized representation of a redaction file is displayed in a browser window or page with whitelisted, redactable data types for interactive redaction. In the example of FIG. 11, cell 1110 is highlighted or otherwise marked for redaction.

Although the normalized representation shown in FIG. 11 has rows, columns, cells, text strings, areas, pages, etc. similarly formatted as the original spreadsheet (not shown), it is not a spreadsheet file. That is, a user of redaction viewer 1100 does not interact with any spreadsheet file—original or whitelisted. Rather, a user of redaction viewer 1100 interacts with a normalized representation of a whitelisted spreadsheet file. Any user-provided redaction instructions—highlights, marks, indications, etc., to redact whitelisted features shown through the normalized representation are used to generate a production spreadsheet file without the user-indicated whitelisted features.

Figure 12:
FIG. 12 depicts an example of a search window of a redaction viewer that can be used to search a term in a redaction file and redact the term in all places where it is mentioned, according to some embodiments disclosed herein.

The user-provided redaction instructions can include those automatically generated by a search functionality 1120 of the redaction viewer. FIG. 12 depicts an example of a "Find and Redact" window 1200 through which a redaction reviewer can direct search functionality 1120 of the redaction viewer to search a term in a redaction file (e.g., a normalized document produced by a normalization process disclosed herein) and redact the term in all places where it is mentioned. If the redaction reviewer determines that no redaction is necessary, a production spreadsheet file is generated based on the redaction file, with all the whitelisted features (e.g., whitelisted data types, whitelisted workbook object types, etc.). Otherwise, a production spreadsheet file is generated with redactions applied to the whitelisted features in the redaction file.

As is explained above, the inventive technique employs whitelisting of data types for a file format that are deemed to be interactively redactable on a display. This file format may contain dozens if not hundreds of data types. For instance, in Microsoft® Excel®, manufactured by the Microsoft Corporation, data as straightforward as a date value may combine and include multiple data types, some of which represent the actual date value, while others represent date formulas and other information such as date value field formatting. Not all these data types, even if they may be distilled out from the formatted file into a separate component, are presentable for interactive redaction. For example, data value field formatting data may comprise cryptic alphanumeric values that are not inherently readable and selectable for redaction.

Moreover, as alluded to above, certain data types may be hidden and unknown to the user, yet there may be a significant security and confidentiality risk of allowing data of these data types to be potentially discoverable in a produced file. Advantageously, the predetermined whitelist of data types ensures that only redactable data is produced and presented, while non-redactable and potentially risky data (and often hidden and unknown data) is removed from the original file. Such hidden data may be discoverable by file format experts. This is not to say that hidden data may not be one of the whitelisted data types. There are times when hidden data may be desired to be exposed and presented in a way that may be redactable. Often, however, in some embodiments, whitelisted data types are predetermined based on selectable data types that may be interactively redacted.

The inventive technique employs whitelisting of data types that are to be copied and regenerated from an original file into a redaction file, rather than blacklisting data types, a technique which removes data types from the original file for production. A significant advantage of whitelisting data types over blacklisting data types is that whitelisting essentially builds the redaction file data type by data type, whereas blacklisting removes data types. The former is more adaptive to updated file formats which may include new data types, either from the format manufacturer or customized by users and/or organizations. The whitelisting technique disclosed herein ensures that such potentially risky and yet-to-be-vetted new data types are not added to the redaction file (e.g., redaction file 1032) because they will not be in the data type whitelist. In contrast, the blacklisting technique will not remove such potentially risky new data types if they are not yet vetted because they will not be in the blacklist. Thus, until and when the new data type is vetted, the whitelist techniques minimizes the risk of unwanted and undesired data copied and regenerated in a redaction file.

Referring again to FIG. 10, in still further embodiments, whitelisted data types 1022 may include a text-based data type and/or numerical-based data type 1042. The system is operable to normalize (1050) the text-based data type and the numerical-based data type. Such normalization may be necessary when the data is generated from a combination of data types into the produced and presented format.

Predetermining which data types to whitelist may be accomplished in several ways. One embodiment involves domain experts who understand the file format 1005 to predetermine which data types to produce and present for redacting and which to drop from an original file. Alternatively or additionally, in some embodiments, the inventive technique may utilize heuristics and machine learning 1060 to automatically determine and/or present whitelist data type candidates to domain experts for whitelisting. Such techniques 560 may involve analyzing the data for a data type. For example, if the data is primarily unstructured text, the data type may be determined as interactively redactable and placed on the whitelist. Data deemed to be formatting information and/or formulaic may not be interactively redactable and, therefore, may not be placed on the whitelist. In this way, in some embodiments, such as that shown in FIG. 10, supported file formats 1005 may be updated (1070) to include a new data type n+1 and whitelisted data types 1022 may be updated to whitelisted data types 1072 that include the new data type n+1 1074 so that new data type n+1 1074 can be included in redaction file 1032 and be presented for interactive redaction via a normalized representation as discussed above (1040).

Figure 13A:
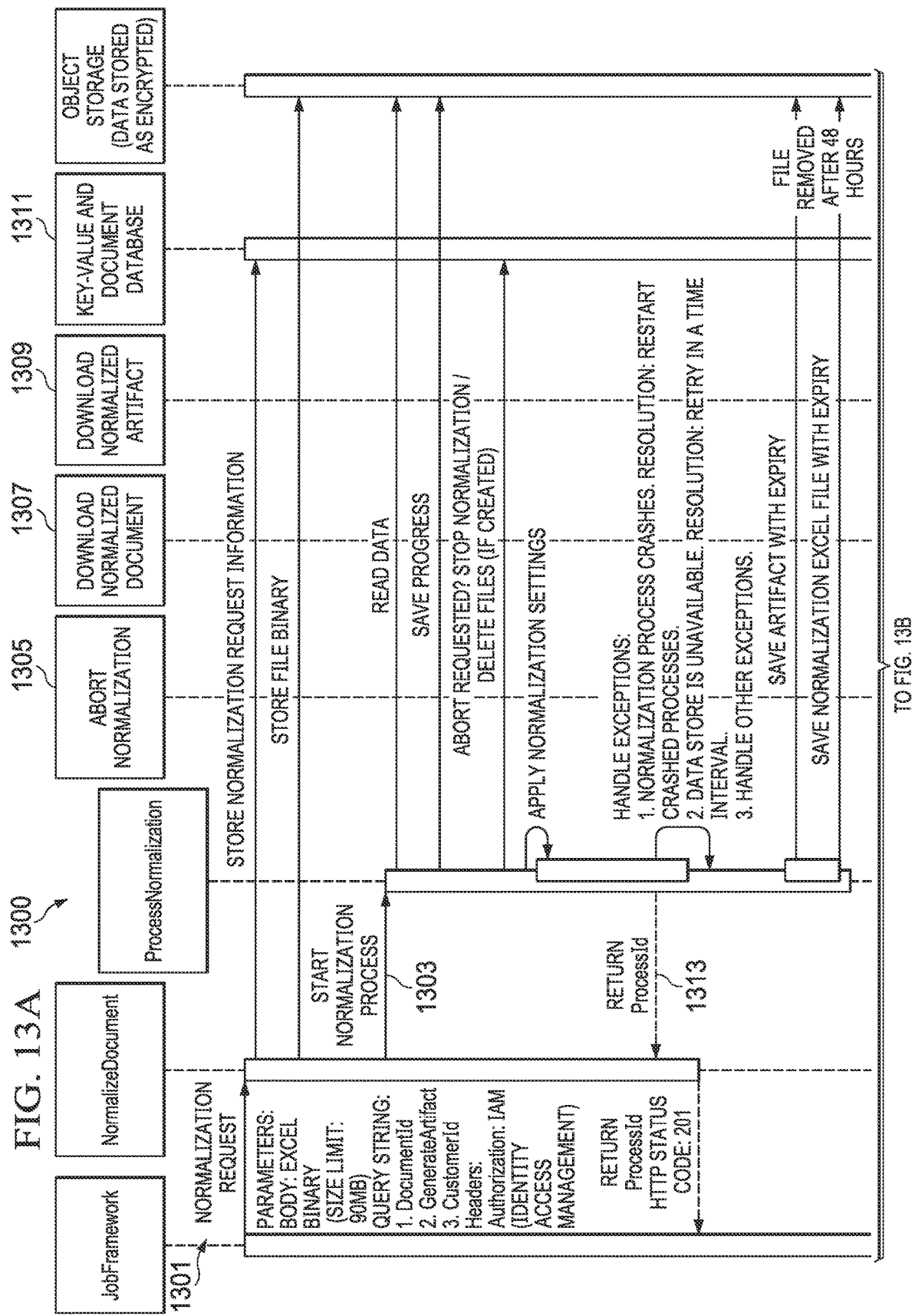
FIGS. 13A-13B together depict a sequence diagram showing an example of operation according to some embodiments disclosed herein.
Figure 13B:
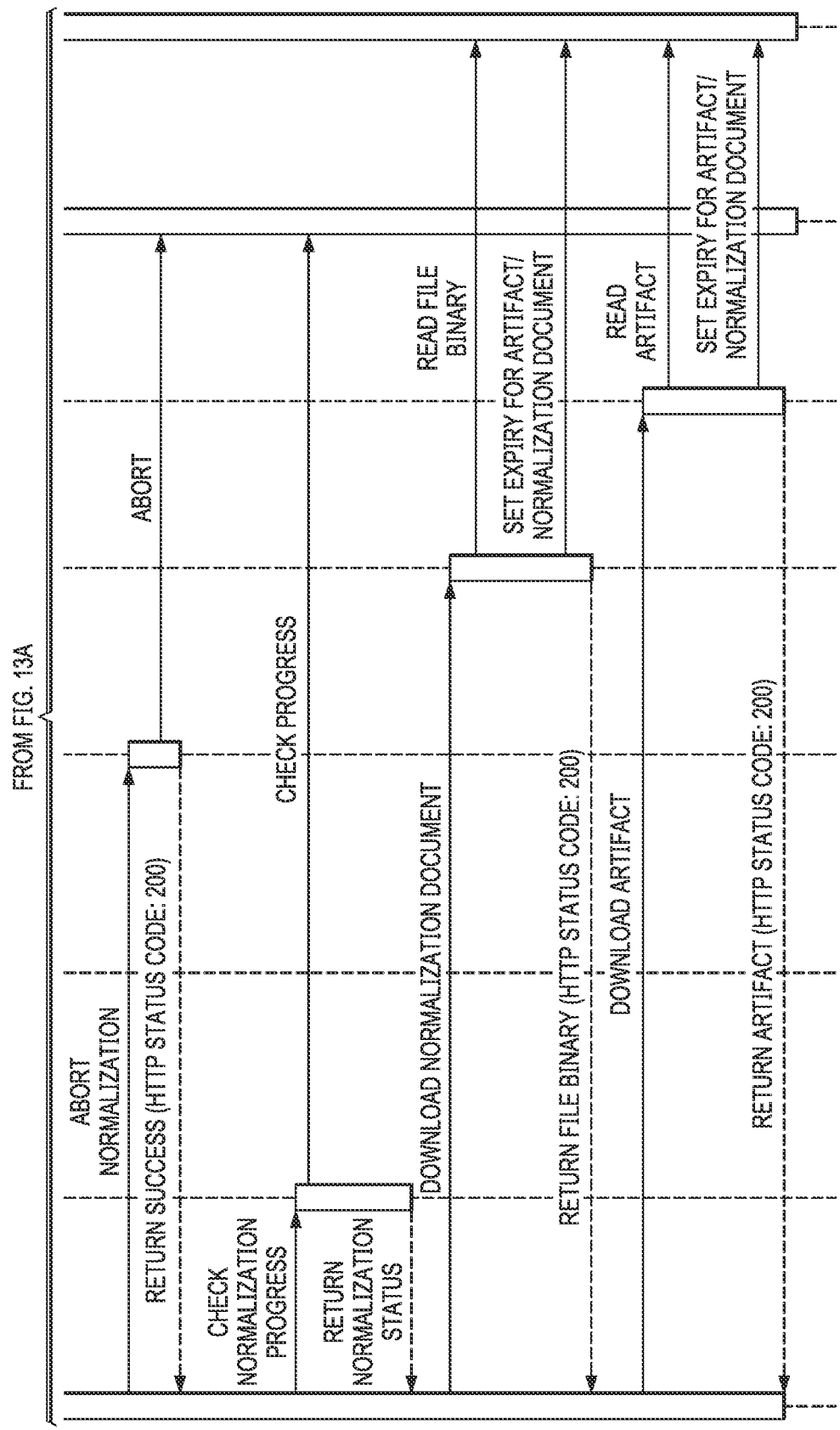

FIGS. 13A-13B depict a sequence diagram that shows an example of operation 1300. In some embodiments, operation 1300 can be implemented as a redaction service provided by e-discovery platform 350. In this example, operation 1300 is initiated in response to a normalization request 1301 from a requester. The normalization request has a payload containing a source file in a binary format (e.g., one that is native to a spreadsheet program) and specifies input parameters and values thereof. The input parameters, which can be passed as a query string, can include a document identifier ("DocumentId") identifying the native binary file, a customer identifier ("CustomerID") identifying the requester, and an artifact generation parameter ("GenerateArtifact") for indicating whether normalized contents are to be stored in the system. As a non-limiting example, the maximum size limit for the native binary file is 90 MB.

Operation 1300 starts a normalization process 1303 and applies default normalization settings. As a non-limiting example, default normalization settings can include those to decrypt password encrypted sections, unhide hidden rows/hidden columns/hidden sheets, show print comments, show all headers and footers, delete blank rows and columns, flatten formulas for data presentation, render graphs as images, remove external links, disable macros, etc. Operation 1300 may store the payload of the normalization request and call a designated API (e.g., "ExcelAPI" provided by e-discovery platform 350) to start normalization process 1303. This can be accomplished by sending a POST request to the designated API which will start a process that runs asynchronously to produce a normalized document. Operation 1300 may create an entry in a data store (e.g., database 1311) to track the status using a process identifier (e.g., "ProcessId" 1313) returned by the asynchronous process that performs the normalization. If the normalization process fails to start, an error status code is returned. Optionally, operation 1300 may abort the normalization request (1305).

Since the process to generate a normalization document runs asynchronously, the normalization request returns immediately and before the output is ready. Thus, operation 1300 is operable to check the status of the asynchronous process by sending a GET request specifying the process identifier to query database 311 about the resource just created. In response to this request, a JavaScript Object Notation (JSON) will be returned that includes a "state" property. The state property may indicate whether the state of the normalization is pending, in-progress, completed, or failed. When the state property indicates "completed", operation 1300 can proceed to the next step.

Once the normalization process completes successfully, the new, normalized document is available for download (1307). Downloading of the normalized document can be accomplished by retrieving the normalized document from the data store using the process identifier and loading the normalized document into the payload of a REST response.

If the normalization request indicates an artifact and the normalization process completes successfully, the artifact can be downloaded in a similar way (1309). An example of an artifact can be a zip file containing normalized data (e.g., normalizeddata_sheet1.xml, normalizeddata_sheet2.xml, etc.), chart images (e.g., sheet1_chart1.png, sheet1_chart2.png, etc.), pictures (e.g., sheet1_picture1.png, sheet2_picture2, etc.), and normalized file metadata (e.g., normalizedfile.meta). As discussed above, the artifact thus generated can be useful for rendering a normalized representation of the normalized document with whitelisted redactable content (e.g., whitelisted features, whitelisted data types, whitelisted sub-datatypes, whitelisted workbook object types, etc.) for interactive redaction through a redaction viewer.

Figure 14:
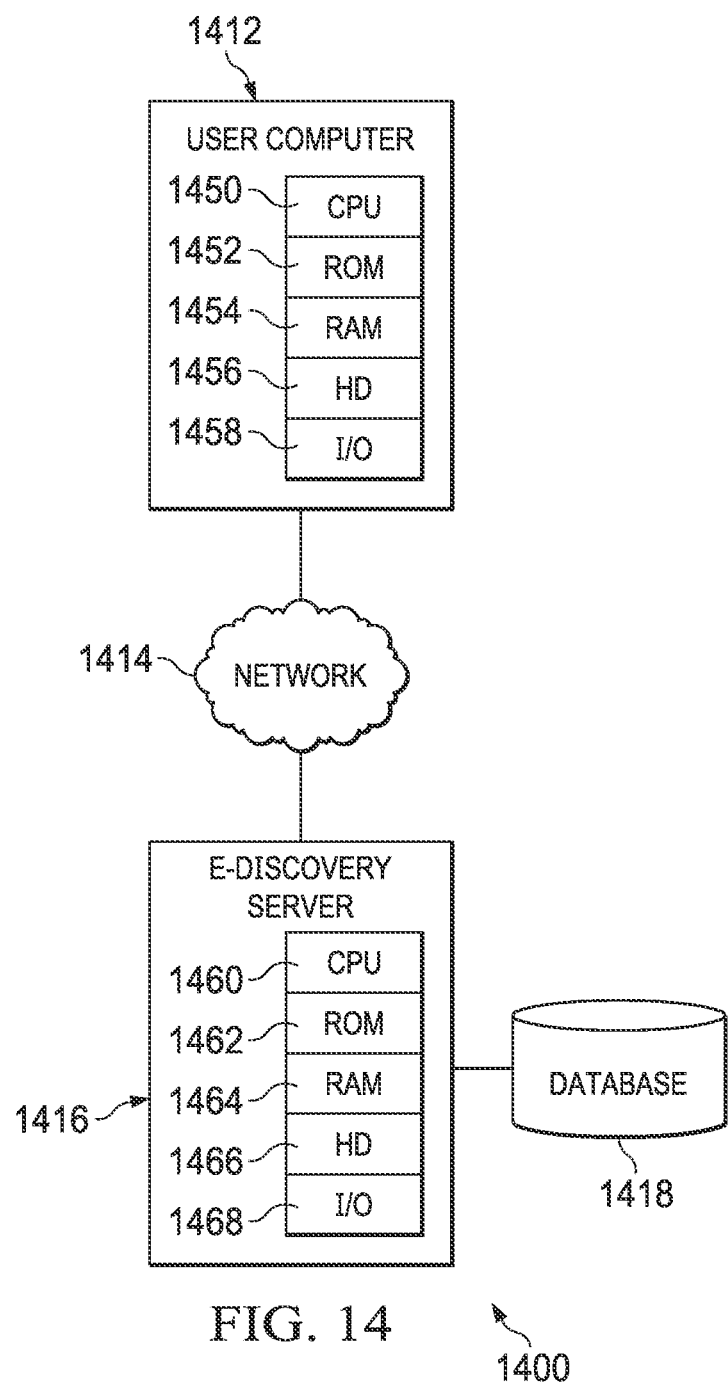
FIG. 14 depicts a diagrammatic representation of an example of a distributed network computing environment for implementing embodiments disclosed herein.

FIG. 14 depicts a diagrammatic representation of an example of a distributed network computing environment for implementing embodiments disclosed herein. In the example illustrated, network computing environment 1400 includes network 1414 that can be bi-directionally coupled to user computer 1412 and e-discovery server 1416 (e.g., one that operates on the premises of an enterprise or one that is hosted in a cloud computing environment). Computer 1416 can be bi-directionally coupled to database 1418. Network 1414 may represent a combination of wired and wireless networks that network computing environment 1400 may utilize for various types of network communications known to those skilled in the art.

For the purpose of illustration, a single system is shown for each of computer 1412 and computer 1416. However, with each of each of computer 1412 and computer 1416, a plurality of computers (not shown) may be interconnected to each other over network 1414. For example, a plurality of computers 1412 and a plurality of computers 1416 may be coupled to network 1414. Computers 1412 may include data processing systems for communicating with computer 1416. Computers 1412 may include data processing systems for form designers whose jobs may require them to design, build, and/or customize forms used in network computing environment 1400.

Computer 1412 can include central processing unit ("CPU") 1450, read-only memory ("ROM") 1452, random access memory ("RAM") 1454, hard drive ("HD") or storage memory 1456, and input/output device(s) ("I/O") 1458. I/O 1458 can include a keyboard, monitor, printer, electronic pointing device (e.g., mouse, trackball, stylus, etc.), or the like. Computer 1412 can include a desktop computer, a laptop computer, a personal digital assistant, a cellular phone, or nearly any device capable of communicating over a network.

Likewise, computer 1416 may include CPU 1460, ROM 1462, RAM 1464, HD 1466, and I/O 1468. Computer 1416 may provide e-discovery services including a redaction service to computer 1412 over network 1414. In some embodiments, database 1418 may be configured for storing normalization artifacts and normalized documents.

Each of the computers in FIG. 14 may have more than one CPU, ROM, RAM, HD, I/O, or other hardware components. For the sake of brevity, each computer is illustrated as having one of each of the hardware components, even if more than one is used. Each of computers 1412 and 1416 is an example of a data processing system. ROM 1452 and 1462; RAM 1454 and 1464; HD 1456 and 1466; and database 1418 can include media that can be read by CPU 1450 or 1460. Therefore, these types of memories include non-transitory computer-readable storage media. These memories may be internal or external to computers 1412 or 1416.

Portions of the methods described herein may be implemented in suitable software code that may reside within ROM 1452 or 1462; RAM 1454 or 1464; or HD 1456 or 1466. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
    receiving, from an application on a user device through a redaction service provided by an e-discovery platform, a normalization request containing a binary file;
    starting, by a normalization processor executing on the e-discovery platform, a normalization process, wherein the normalization process comprises:
        applying a whitelist to the binary file in a whitelisting process which produces a normalized document with whitelisted features;
        performing an artifact generation process to generate an artifact containing the normalized document; and
        storing the artifact in a data store on the e-discovery platform; and
    providing, through the redaction service, the artifact containing the normalized document to the user device, wherein the artifact is used by a browser program on the user device to render a normalized representation of the normalized document for interactive redaction.

2. The method according to claim 1, wherein the binary file comprises a source workbook and wherein the whitelisting process further comprises:
    creating a target workbook which is initially empty; and
    iteratively processing each source worksheet in the source workbook to transfer the whitelisted features to the target workbook using the whitelist and thereby transform the target workbook into a normalized workbook.

3. The method according to claim 2, wherein the artifact generation process further comprises:
    receiving the normalized workbook;
    for each worksheet of the normalized workbook, adding at least one of a chart, picture, comment, or worksheet content to a zip file; and
    adding workbook metadata to the zip file, wherein the artifact comprises the zip file.

4. The method according to claim 2, wherein the iteratively processing each source worksheet in the source workbook further comprises:
    pre-processing a source worksheet of the source workbook, the pre-processing including unhiding the source worksheet, unhiding a row of the source worksheet, or unhiding a column of the source worksheet to thereby produce a pre-processed worksheet;
    transferring content of the source worksheet to the pre-processed worksheet to thereby produce a target worksheet; and
    post-processing the target worksheet, the post-processing including removing empty rows and columns from the target worksheet and matching cell heights and widths to those of the source worksheet.

5. The method according to claim 4, wherein the whitelist specifies whitelisted workbook object types and wherein the transferring further comprises:
    removing a set of workbook objects of the whitelisted workbook object types from the source worksheet; and
    transferring cell values of the set of workbook objects to the target worksheet.

6. The method according to claim 1, wherein starting the normalization process comprises:
    making an application programming interface (API) call to an API provided by the e-discovery platform, wherein the API call starts the normalization process which runs asynchronously to produce the normalized document with the whitelisted features.

7. A system, comprising:
    a processor;
    a non-transitory computer-readable medium; and
    stored instructions translatable by the processor for:
        receiving, from an application on a user device through a redaction service provided by an e-discovery platform on which the system operates, a normalization request containing a binary file;
        starting, by a normalization processor executing on the processor, a normalization process, wherein the normalization process comprises:
            applying a whitelist to the binary file in a whitelisting process which produces a normalized document with whitelisted features;
            performing an artifact generation process to generate an artifact containing the normalized document; and
            storing the artifact in a data store on the e-discovery platform; and
        providing, through the redaction service, the artifact containing the normalized document to the user device, wherein the artifact is used by a browser program on the user device to render a normalized representation of the normalized document for interactive redaction.

8. The system of claim 7, wherein the binary file comprises a source workbook and wherein the whitelisting process further comprises:
    creating a target workbook which is initially empty; and
    iteratively processing each source worksheet in the source workbook to transfer the whitelisted features to the target workbook using the whitelist and thereby transform the target workbook into a normalized workbook.

9. The system of claim 8, wherein the artifact generation process further comprises:
    receiving the normalized workbook;
    for each worksheet of the normalized workbook, adding at least one of a chart, picture, comment, or worksheet content to a zip file; and
    adding workbook metadata to the zip file, wherein the artifact comprises the zip file.

10. The system of claim 8, wherein the iteratively processing each source worksheet in the source workbook further comprises:
    pre-processing a source worksheet of the source workbook, the pre-processing including unhiding the source worksheet, unhiding a row of the source worksheet, or unhiding a column of the source worksheet to thereby produce a pre-processed worksheet;

transferring content of the source worksheet to the pre-processed worksheet to thereby produce a target worksheet; and post-processing the target worksheet, the post-processing including removing empty rows and columns from the target worksheet and matching cell heights and widths to those of the source worksheet.

11. The system of claim 10, wherein the whitelist specifies whitelisted workbook object types and wherein the transferring further comprises:

removing a set of workbook objects of the whitelisted workbook object types from the source worksheet; and transferring cell values of the set of workbook objects to the target worksheet.

12. The system of claim 7, wherein starting the normalization process comprises:

making an application programming interface (API) call to an API provided by the e-discovery platform, wherein the API call starts the normalization process which runs asynchronously to produce the normalized document with the whitelisted features.

13. A computer program product comprising a non-transitory computer-readable medium storing instructions translatable by a processor for:

receiving, from an application on a user device through a redaction service provided by an e-discovery platform, a normalization request containing a binary file;

starting, by a normalization processor executing on the processor, a normalization process, wherein the normalization process comprises:

applying a whitelist to the binary file in a whitelisting process which produces a normalized document with whitelisted features;

performing an artifact generation process to generate an artifact containing the normalized document; and storing the artifact in a data store on the e-discovery platform; and providing, through the redaction service, the artifact containing the normalized document to the user device, wherein the artifact is used by a browser program on the user device to render a normalized representation of the normalized document for interactive redaction.

14. The computer program product of claim 13, wherein the binary file comprises a source workbook and wherein the whitelisting process further comprises:

creating a target workbook which is initially empty; and iteratively processing each source worksheet in the source workbook to transfer the whitelisted features to the target workbook using the whitelist and thereby transform the target workbook into a normalized workbook.

15. The computer program product of claim 14, wherein the artifact generation process further comprises:

receiving the normalized workbook;

for each worksheet of the normalized workbook, adding at least one of a chart, picture, comment, or worksheet content to a zip file; and adding workbook metadata to the zip file, wherein the artifact comprises the zip file.

16. The computer program product of claim 14, wherein the iteratively processing each source worksheet in the source workbook further comprises:

pre-processing a source worksheet of the source workbook, the pre-processing including unhiding the source worksheet, unhiding a row of the source worksheet, or unhiding a column of the source worksheet to thereby produce a pre-processed worksheet;

transferring content of the source worksheet to the pre-processed worksheet to thereby produce a target worksheet; and post-processing the target worksheet, the post-processing including removing empty rows and columns from the target worksheet and matching cell heights and widths to those of the source worksheet.

17. The computer program product of claim 16, wherein the whitelist specifies whitelisted workbook object types and wherein the transferring further comprises:

removing a set of workbook objects of the whitelisted workbook object types from the source worksheet; and transferring cell values of the set of workbook objects to the target worksheet.

18. The computer program product of claim 13, wherein starting the normalization process comprises:

making an application programming interface (API) call to an API provided by the e-discovery platform, wherein the API call starts the normalization process which runs asynchronously to produce the normalized document with the whitelisted features.

\* \* \* \* \*